United States Patent [19]

Ramos et al.

[11] 4,162,595
[45] Jul. 31, 1979

[54] PREFABRICATED ROOF STRUCTURE AND ERECTION METHOD

[76] Inventors: Mario L. Ramos; John Ramos, both of Terrace Ave., Naugatuck, Conn. 06770

[21] Appl. No.: 868,481

[22] Filed: Jan. 11, 1978

[51] Int. Cl.² ............................................. F04B 1/346
[52] U.S. Cl. .......................................... 52/69; 52/18; 52/741; 52/122
[58] Field of Search ...................... 52/66, 69, 645, 646, 52/18, 64, 71, 741, 90, 79.5, 13, 122

[56] References Cited

U.S. PATENT DOCUMENTS

| | | | |
|---|---|---|---|
| 2,762,084 | 9/1956 | Singer | 52/64 |
| 3,404,496 | 10/1968 | Ballard | 52/64 |
| 3,653,165 | 4/1972 | West | 52/69 X |
| 3,807,104 | 4/1974 | Webster | 52/71 X |
| 3,983,665 | 10/1976 | Burton | 52/71 |
| 4,006,856 | 2/1977 | Nilsson | 126/270 X |

Primary Examiner—Price C. Faw, Jr.
Assistant Examiner—Carl D. Friedman
Attorney, Agent, or Firm—McCormick, Paulding & Huber

[57] ABSTRACT

A prefabricated sawtooth roof assembled from a plurality of roof modules houses solar energy collector panels which comprise a part of a solar energy collector system wholly enclosed within a building envelope. Each roof module comprises a glazed, insulated, watertight unit and may also include other shop installed mechanicals such as plumbing, heating, ventilating, lighting and electrical equipment. Each roof module has at least one structurally hinged panel section which is collapsed for highway transportation and pivoted to erection position as the module is hoisted from its carrier to the top of a building wall or other supporting structure.

30 Claims, 10 Drawing Figures

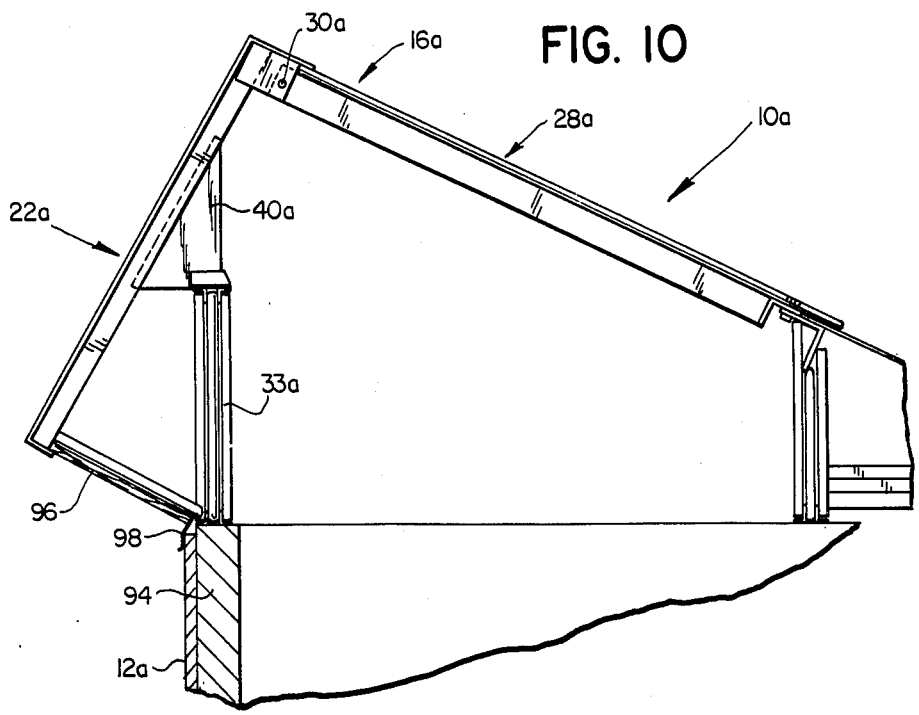
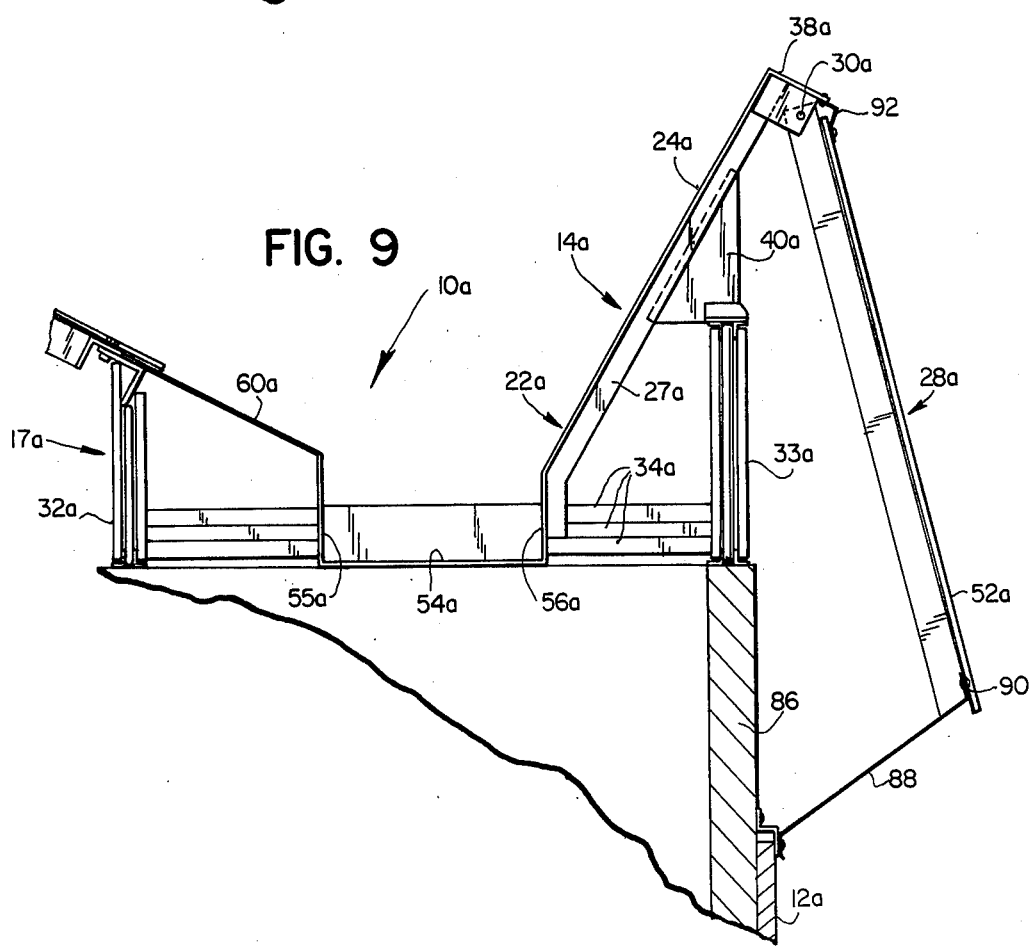

4,162,595

PREFABRICATED ROOF STRUCTURE AND ERECTION METHOD

BACKGROUND OF THE INVENTION

This invention relates in general to roof systems and erection methods and deals more particularly with an improved prefabricated roof structure assembled from a plurality of roof modules and particularly adapted to house solar energy collectors.

The high cost of building construction coupled with the high cost of energy and the need to conserve energy resources has created a need for improved building structures which may be erected at reasonable cost and which provide for the efficient utilization of celestial energy sources for heating, lighting and air conditioning, as present technology allows, with minimal requirements for conventional backup systems. Most presently available solar energy collector systems utilize some form of collector panel which must be supported in upwardly inclined position for optimal solar incidence. Such panel structures are usually supported on the roof of a building and require substantial supporting structure for wind bracing. The panels and associated plumbing and supporting structure, being mere building appendages, tend to detract from the aesthetic qualities of most buildings. Further, the exposed position of the panels and portions of the plumbing system associated therewith invariably result in heat loss to the atmosphere, which materially reduces the thermal efficiency of the system. The lack of compatible building structures has generally prevented such solar energy collection systems from achieving full potential.

The cost of a roof system generally comprises a substantial portion of the total cost of a building. In erecting a conventional roof structure a variety of equipment and considerable manpower of varying skills may be required to handle, process, and assemble the assortment of items from which the roof system is made. A considerable portion of the roof assembly work must be performed from ladders or staging with inherent risk to the workmen. Additional high work may be required to install required mechanical equipment associated with the roof structure, such as heating, lighting, electrical, ventilating equipment and the like, after the roof has been enclosed, requiring additional skilled labor and introducing additional elements of risk to the workmen who perform these tasks. The present invention is directed to the aforedescribed general problems. More specifically, it is a general aim of the invention to provide an improved roof structure, particularly adapted to support solar energy panels within a building envelope, assembled from shop fabricated roof modules suitable for highway transportation from the shop to a job site and which may be hoisted directly from a carrier to a supporting structure to provide finished roof coverage for a substantial portion of the supporting structure with each hoist.

SUMMARY OF THE INVENTION

In accordance with the present invention a prefabricated roof structure is assembled from a plurality of modular units. Each roof module has a window wall and is adapted to house and structurally support at least one solar energy panel in a position for optimal solar incidence. Each roof module may include a structurally hinged roof panel section which may be folded to a carrying position to facilitate highway transportation from a fabricating shop to a job site. In accordance with a method of the present invention, a roof module is unfolded from its carrying position to an erection position as it is hoisted from a carrier onto building walls, columns or other supporting structure.

BRIEF DESCRIPTION OF THE DRAWINGS

FIG. 9 is a fragmentary section view of another roof assembly and shows another starter module embodying the invention.

FIG. 10 is a fragmentary sectional view similar to FIG. 9, but shows another finish module.

DETAILED DESCRIPTION OF PREFERRED EMBODIMENT AND ERECTION METHOD

Figure 1:
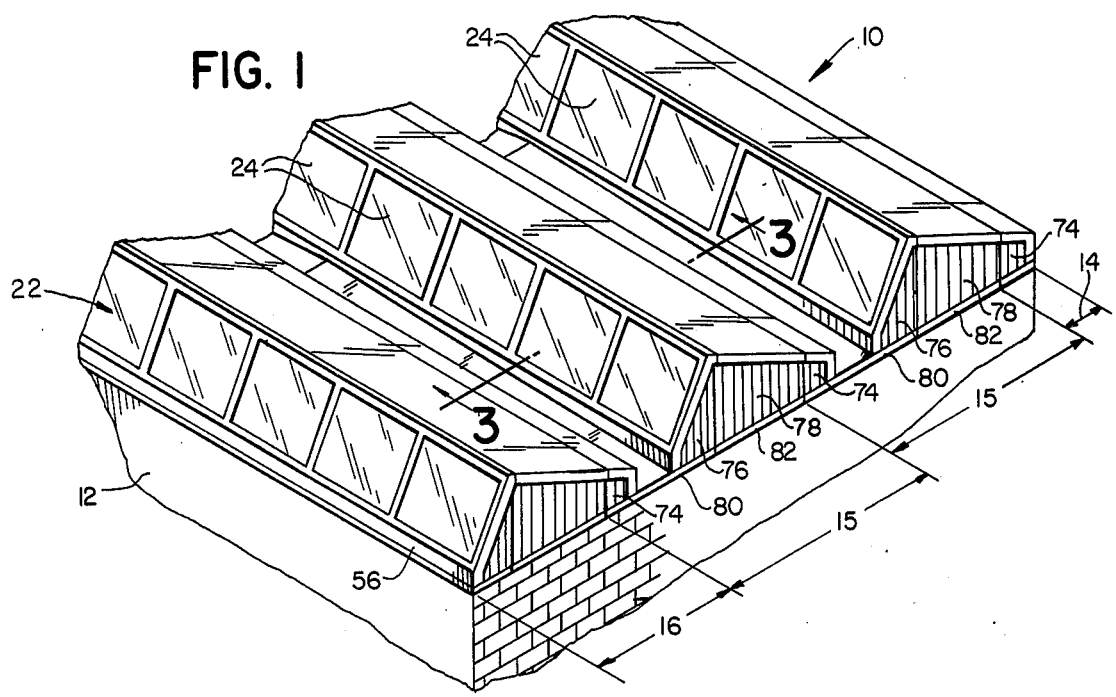
FIG. 1 is a fragmentary perspective view of a building which has a prefabricated roof assembled from roof modules embodying the present invention.

Turning now to the drawings, a roof system embodying the present invention and indicated generally by the reference numeral 10 is illustrated with reference to a building 12, shown in FIG. 1. The roof 10 comprises a prefabricated sawtoothed roof structure assembled from a plurality of roof sections or modular units which include a starter module, designated generally by the numeral 14, a plurality of filler modules, indicated generally at 15, 15 and a finish module indicated generally at 16. Each roof module is provided in a clear span length for highway transportation, usually 30-80 feet, and comprises a glazed, insulated, watertight unit and may have facilities to control and, if desired, utilize water from rain runoff and snow melt. Each modular unit may further include at least portions of a solar energy collection system, backup systems for heating, air conditioning and sanitation, and at least one structurally hinged panel which may be folded to a carrying position to facilitate highway transportation.

Figure 3:
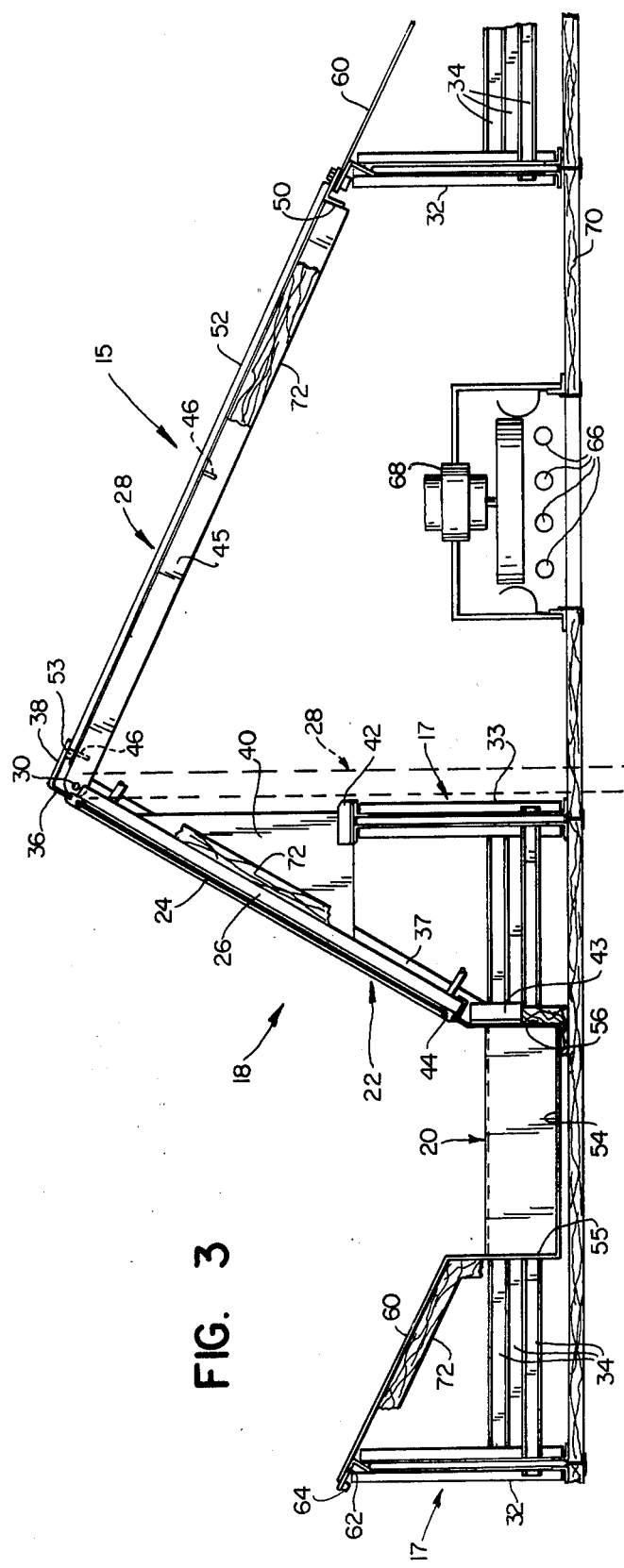
FIG. 3 is a somewhat enlarged fragmentary sectional view taken generally along the line 3—3 of FIG. 1.
Figure 4:
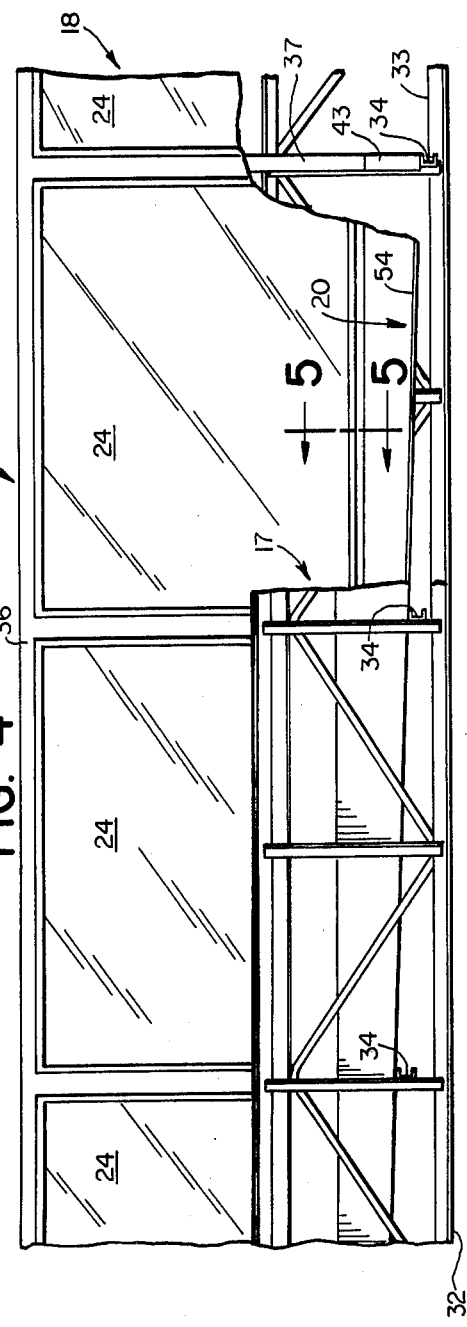
FIG. 4 is a fragmentary elevational view of the module as viewed looking toward the right of FIG. 3.
Figure 5:
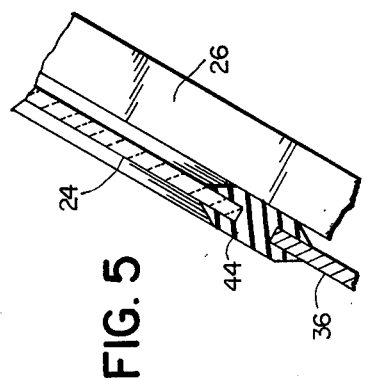
FIG. 5 is a fragmentary sectional view taken along the line 5—5 of FIG. 4.

Referring now particularly to FIGS. 3 and 4, a typical filler module 15 comprises a truss assembly, indicated generally at 17, and a roof panel assembly, designated generally by the reference numeral 18. The panel assembly includes a rain troughwalkway, designated generally by the numeral 20, and a plurality of roof panel sections which will be hereinafter more fully described. The building 12 is designed to face in a direction which assures effective utilization of available solar energy. The illustrated building is particularly adapted for erection in the northern hemisphere, therefore, one of the roof panel sections, indicated generally at 22, is designated a south panel section, faces in a generally southerly direction, and is vertically inclined for optimal solar incidence. The illustrated south panel section is supported in fixed position on the truss assembly 17 and is upwardly inclined at an angle of approximately 60° to the horizontal. It is provided with at least one translucent window panel 24, but preferably it has a plurality of translucent panels 24, 24. At least one solar energy collector panel 26 is or may be supported on the panel section 22 inwardly of an associated window panel 24 and in general registry therewith. The solar collector panel 26 is of a conventional type and may comprise a part of the prefabricated roof module 14 or, if desired, may be installed after the building has been erected. A second roof panel section 28, designated a north panel section, is preferably hingedly connected by pivot pins to the upper end of the south panel section 22 to pivot about a horizontal axis 30 between a carrying or transit position, wherein it is disposed in a generally vertically depending position relative to the panel section 22, as indicated by broken lines in FIG. 3, and an erected position, wherein it extends laterally outwardly and downwardly from the panel section 22, as shown in full lines, and as will be hereinafter further discussed. The panel section 28 preferably comprises an insulated roof panel made from corrugated metal or like material and associated reinforcing structure and is adapted to be pivoted to its depending or transit position to decrease the effective width of the roof filler module 15 and thereby facilitate highway transportation from the fabrication shop to an erection site.

Considering the roof filler module 15 in further detail, the truss assembly 17 includes a pair of horizontally extending flat trusses or truss beams 32 and 33 and associated panel supporting structure hereinafter described. The truss beams are connected in laterally spaced parallel relation by a longitudinally spaced series of cross braces or channel members 34, 34 which extend therebetween and which are arranged at decreasing elevations along the span of the beams.

The panel section 22 includes a horizontally elongated generally rectangular window frame 36, which is formed from flat metal, and a longitudinally spaced series of upwardly inclined angle members 37, 37 which reinforce it. The frame 36 has a longitudinal series of rectangular window openings which contain the window panels 24, 24, as best shown in FIG. 4. The upper marginal portion of the frame 36 is bent laterally outwardly and downwardly to form a lip 38 which extends along the ridge of the sawtooth roof section 15. The panel section 22 is rigidly mounted on the truss assembly 17 in an upwardly inclined position with its upper end disposed generally above and immediately laterally outwardly beyond the truss beams 33, substantially as shown in FIG. 3. Support for the panel section 22 is provided by angle plates 40, 40, mounted on tee members 42, 42 carried by the truss beam 33, and welded or otherwise secured to the angle members 37, 37. The panel section 22 is further supported at its lower end by a plurality of angle members 43, 43 which extend upwardly from the cross members 34, 34 and which are tack welded or otherwise secured to the lower ends of the angle members 37, 37. The window panels 24, 24 are preferably made from a suitable transparent plastic material. Each window panel 24 is retained in an associated window opening in the frame 36 by a continuous rectangular gasket 44 of molded rubber or like material.

The panel section 28 has a structural supporting frame which includes a longitudinally spaced series of laterally extending angle members 45, 45 connected together by laterally spaced and longitudinally extending angle members 46, 46, as shown in FIG. 3. At its upper end each member 45 is hingedly connected to an associated angle member 27 by a pivot pin which defines the axis 30. The lower end of each angle member 45 is connected to one leg of a longitudinally extending angle member 50 which defines the lower marginal portion of the panel section 28. The other leg of the angle member 50 extends laterally outwardly in general alignment with the upper surfaces of the angle members 45, 45 and has a longitudinally spaced series of bolt holes drilled or punched therethrough for a purpose which will be hereinafter further evident. The aforedescribed supporting structure carries a roof panel 52 which may be made from corrugated metal or other suitable roofing material, and which may be coated on its outer surface with suitable material to provide a finished roof surface. If desired, the outer surface of the panel 52 may comprise a reflecting surface to reflect solar energy to the south panel of an adjacent roof module. The longitudinally extending upper marginal edge portion of the roof panel 52 is disposed below the lip 38 when the panel section 28 is in its erected position. A suitable elastomeric sealing member 53 is adhered to and extends along the upper marginal edge portion of the panel 52 for sealing engagement with the lower surface of the lip 38 when the roof section 28 is in its erected or full line position of FIG. 3. A lower marginal edge of the panel 52 overlies an associated portion of the angle member 50, substantially as shown in FIG. 3.

The rain trough-walkway 20 is preferably formed from flat metal and comprises generally horizontally disposed and slightly downwardly pitched trough which has a generally U-shaped cross section. More specifically, the trough comprises a bottom wall 54 and a pair of laterally spaced apart side walls 55 and 56 which extend upwardly from the bottom wall. The upper edge of the side wall 56 is connected to the lower edge of the window frame 36 to form a continuation thereof and may be welded or otherwise secured thereto. The bottom wall 54 may be pitched in one direction, that is from one side of the roof module 15 toward the opposite side thereof, or may be downwardly pitched in opposite directions from a central point toward opposite sides of the module, as for example where a single roof module extends across the entire width of a building. The downwardly pitched walkway formed by the bottom wall 54 is supported at longitudinally spaced intervals on the cross braces 34, 34, and it is for this reason that the latter braces are arranged at decreasing elevations along the span, as generally shown in FIG. 3.

The illustrated roof panel assembly 18 includes another roof panel section 60 which is connected to the upper edge of the side wall 56 and which extends upwardly and laterally outwardly therefrom. The roof panel section 60 may be formed with the trough 20 or may be welded or otherwise connected thereto by suitable fastening means. The upper edge of the panel section 60 is supported by the upper portion of an associated truss beam 32, as shown in FIG. 3. A longitudinally extending angle member 62 is tack welded or otherwise secured to the upper surface of the truss beam 32 to support the upper marginal edge portion of the roof section 60 and has a longitudinally extending flat bar 64 tack welded to the lower surface of its upwardly extending leg, as best shown in FIG. 3. Bolt holes are drilled or punched at longitudinally spaced intervals along the upper edge of the roof section 60 in registry with tapped bolt receiving openings in the upwardly extending leg of the angle member 62 and the bar 64 and for registry with bolt holes in an angle member 50 of an associated roof section to be connected thereto.

The illustrated solar energy panel 26 may be of any suitable type and is supported inwardly of the window panel 24 in sealing engagement with the gasket 44 which supports the latter panel. The gasket maintains the solar energy collector panel in parallel spaced relation to the translucent window panel and forms an efficient seal to provide a dead air space between the two panels. Suitable fasteners or clips are provided on the inner side of the roof panel section 22 to releasably retain the solar energy panel 26. As previously noted, the prefabricated roof structure 10 may be provided with suitable backup systems for heating, air conditioning and the like. As shown in FIG. 3 the module 15 has a lighting trough which supports fluorescent lighting fixtures 66, 66 and an energy recovery fan 68 for the circulating air. Suitable prefabricated ducts (not shown) may also be provided, if desired. If a hidronic solar energy collection system is utilized associated supporting plumbing may also be provided. The illustrated roof section shown in FIG. 3 has a prefabricated ceiling 70 which may comprise corrugated aluminum or other appropriate ceiling material. The inner surfaces of the module 15 are or may be covered with suitable insulating material such as indicated at 72.

Figure 6:
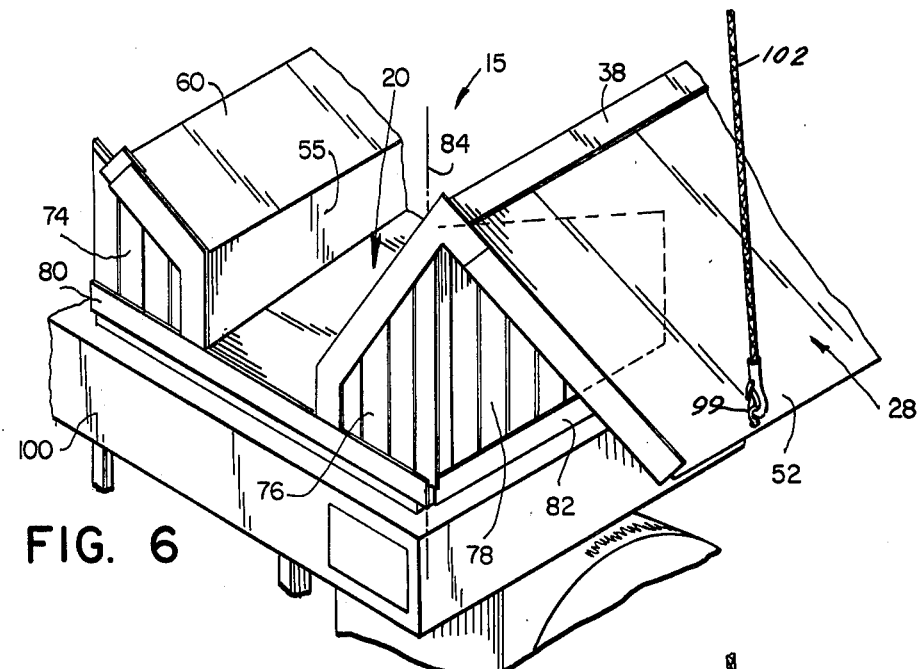
FIGS. 6-8 illustrate successive steps in the erection of the roof structure of FIG. 1.
Figure 7:
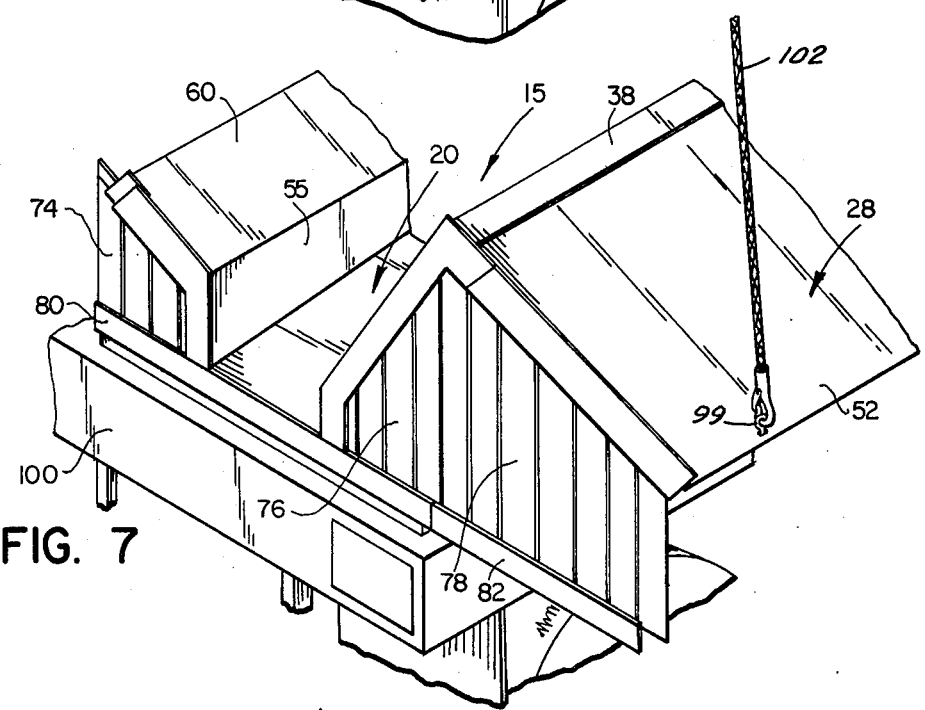
Figure 8:
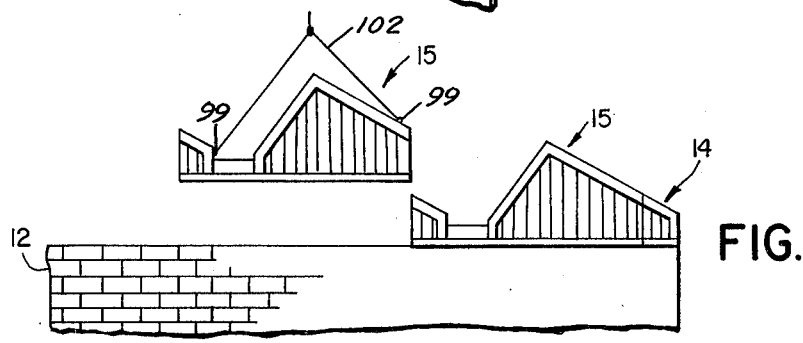

A single module may span a building or may be joined with one or more other modules of generally like kind, with expansion joints therebetween, to form a span. However, the roof module or modules which form the longitudinally opposite ends of the span are provided with additional end panel sections which form closures for the opposite ends of the roof structure. Referring now to FIG. 1, each of the illustrated modules 15, 15 comprises an end portion of the roof structure 10 and includes end panel sections 74, 76 and 78 and sills 80 and 82. The panel sections 74 and 76 and the sill 80 are mounted in fixed position at one end of the module 15 and provide a partial closure for an associated end portion of the roof structure 10, however, the panel section 78 and its associated sill 82 are supported to pivot about a vertical axis 84 between a traveling position wherein it is disposed in generally adjacent parallel relation with the truss beam 33, as best shown in FIG. 6 and an erection position, wherein it cooperates with the roof panel section 28 to form a portion of the closure for an associated end portion of the roof structure, as illustrated in FIG. 7.

Referring again to FIG. 1, each starter module 14 comprises a portion of a filler module 15 which includes a truss beam 32, a north roof panel 60, and an associated side wall 55, constructed and arranged generally as aforedescribed. The starter module or modules which form the opposite ends of the roof span are, of course, provided with end panel sections and sills, as required, to close the opposite ends of the roof structure.

The finish module 16 also comprises a portion of a filler module and includes a side wall 56, an associated south roof panel section 22 carried by a truss beam 33 and related supporting structure, as aforedescribed. The finish module 16 further includes a north roof panel section 28 pivotally connected to the latter panel section 22 and joined to an adjacent filler module 15 substantially as shown in FIG. 1. The longitudinally opposite ends of the finish module or modules which form the roof span are provided with sills, end closure panels, and such flashing as may be required to provide suitable roof finish.

FIGS. 9 and 10 illustrate other starter and finish modules for starting and finishing a roof structure and, as shown, comprise part of a building 12a. Parts of the illustrated modules which correspond to parts of the modules previously described bear the same reference numerals as previously described parts with a letter "a" suffix and will not be further described in detail. The starter module, shown in FIG. 9 and indicated generally at 14a, is similar in some respects to a filler panel 15 and includes a truss assembly 17a which supports a roof panel section 60a, a rain trough-walkway 20, and a south panel section 22a. The panel section 22a may be glazed, as previously described, however, as shown it comprises a solid, unglazed roof panel. A north panel section 28a is pivotally connected to the upper end of the south panel section 22a, however it will be noted that the pivotal axis 30a is laterally offset some distance from the upper end of the angle members 27a, 27a which form part of the panel section 22a. The panel section 28a is inclined downwardly and outwardly away from an associated building wall indicated at 86. The lower end of the panel section 28a is connected to the building wall 86 by a longitudinally extending flashing plate 88 which has an upwardly bent upper marginal edge portion 90 disposed in underlying relation to an associated lower marginal edge portion of the roof panel 52a. Another longitudinally extending flashing strip 92 is connected in underlying relation with the lip 38a and in overlying relation with the roof panel 52a. The latter flashing strip is attached to the lip and to the roof panel by sheet metal screws or the like.

The finish module 16a shown in FIG. 10 is also similar in many respects to a filler module 15 and includes a south roof panel section 22a carried by a truss beam 33a which is supported on an associated building wall 94. A suitable reinforced and longitudinally extending closure panel 96 extends between the lower end of the roof panel 22a and the lower end of the truss beam 33a, substantially as shown. A flashing strip 98 carried by the panel 96 overlies an associated marginal edge portion of the building wall 94. The finish module 16a further includes a north panel section 28a pivotally connected to the panel section 22a substantially as shown.

Figure 2:
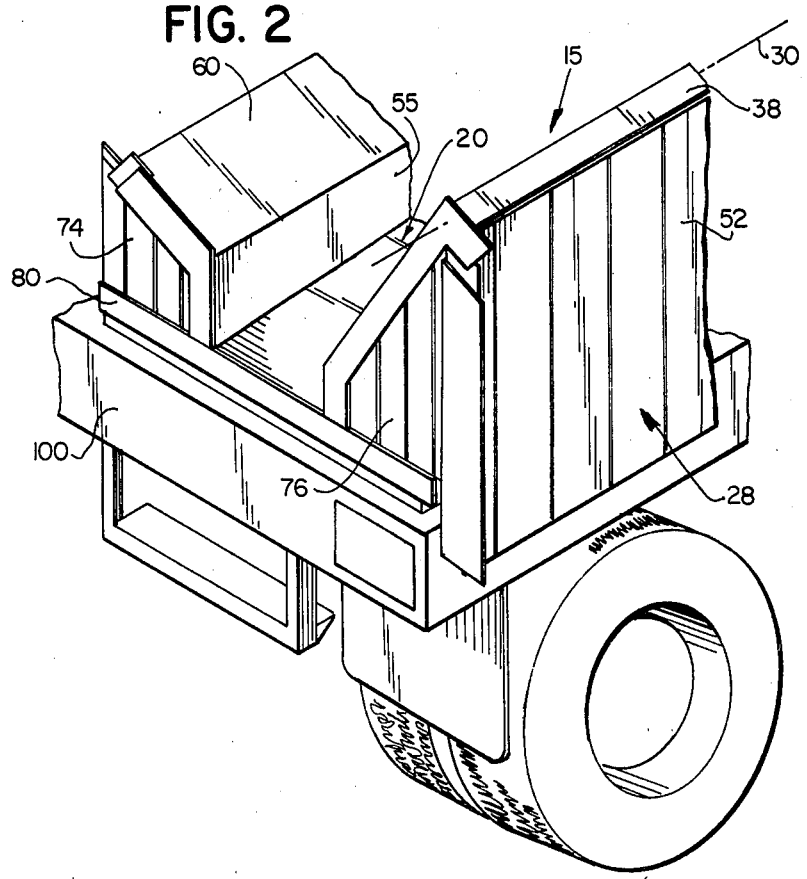
FIG. 2 is a fragmentary perspective view of a roof module shown in a transporting position on a carrier or flat bed truck.

Lifting rings 99,99 welded or otherwise secured to each roof module at critical lifting points facilitate erection. At least one such lifting ring is attached to each pivoted north panel section. In accordance with a preferred method for erecting a roof structure from modules embodying the present invention, each module is shop fabricated and lifted by a crane or the like and placed on an associated carrier or flat bed truck, such as the truck 100 shown in FIG. 2, for transportation to an erection site. A sling 102 which has three legs of predetermined length for lifting stability is preferably employed to hoist each roof section. When such a sling 102 is connected to the lifting rings 99,99 associated with a roof module a proper balanced condition is attained.

Preparatory to erecting a roof structure, each filler module 15, for example, is hoisted with its north panel section 28 in erection position and placed on the flat bed truck 100. The sling is next removed and the north panel section 28 folded to its depending or transit position to reduce the effective width of the roof module to enable highway transporation. After the roof section has been suitably blocked and secured to the carrier it may be transported over the road to the erection site.

A typical erection crew may comprise a crane operator, one hookup man and two assemblers. In erecting a typical roof structure, a starter module is first hoisted into position on the supporting structure, which may comprise building walls or columns. When a starter module which includes a rain trough-walkway is used, such as the starter module 14a of FIG. 9, it is hooked up to the three legged sling. The two assemblers may stand in the trough and ride up with the module to position and anchor it on the supporting structure. Next, a filler module 15 is hooked up and guidelines are attached. Since at least one leg of the sling is connected to the panel section 28, which is in its transit position on the carrier, the initial operation of lifting the module from the carrier simultaneously pivots the roof section 28 to its erection position. If the filler module 15 has a pivoted end closure panel and sill, the hookup man may pivot the end panel and its sill to its closure forming position and secure it in the latter position before the filler module is hoisted to position on the supporting structure. After the filler module has been positioned, the two assemblers working from the walkway 20 of the previously positioned module may bolt the adjacent modules together without substantial risk to the assemblers, regardless of building height. It is estimated that a four man crew erecting a roof structure from modules of 40 foot span can frame and cover an area of from 8,000 to 10,000 square feet in a single day. Moreover, the structure can be disassembled for reuse at another location or to facilitate building expansion at minimum cost and with substantially no waste of construction material.

The present roof system provides the advantage of substantially immediate building coverage with virtually no waste of material. The arrangement of the rain trough-walkways provides stable working platforms for maximum safety of the assemblers during erection and further provides convenient walkways for future servicing of the structure. Further, if the roof system includes a hidronic solar energy collection system, the roof troughs may be used to collect rainwater for diversion to storage tanks which assure an adequate water supply in areas where water is in short supply or of poor quality. The north panels may also be arranged to serve as reflectors to enhance the solar incidence of the collector windows.

We claim:

1. A roof structure comprising a truss assembly including a plurality of horizontally extending truss beams and a plurality of braces extending between and connecting said truss beams in laterally spaced parallel relation, a horizontally elongated roof panel assembly supported on said truss assembly and having a plurality of roof panel sections including an inclined roof panel section supported in a fixed upwardly inclined position on said truss assembly, one of said roof panel sections being connected to the upper end of another said roof panel section to pivot relative thereto about a horizontal axis between one position wherein said one panel section extends laterally outwardly from said other roof panel section and another position wherein said one panel section depends in a generally vertically disposed position from said other roof panel section, and lifting means attached at critical balance positions to said one roof panel section and at least another of said roof panel sections for raising said one roof panel section from said one to said other position and for lifting said roof panel assembly and said truss assembled with said one roof panel section in said one position.

2. A roof structure comprising a truss assembly including a plurality of horizontally extending truss beams and a plurality of braces extending between and connecting said truss beams in laterally spaced parallel relation, and a horizontally elongated roof panel assembly supported on said truss assembly and including a first roof panel section supported in an upwardly inclined position, a generally horizontally disposed rain trough-walkway supported on said truss assembly and connected to said first roof panel section, said rain trough-walkway having a generally U-shaped cross section and including a downwardly pitched bottom wall and a pair of laterally spaced side walls extending upwardly from said bottom wall, and a second roof panel section connected to the upper end of said first roof panel section to pivot relative thereto about a horizontal axis between a first position wherein it depends in a generally vertically disposed position from said first roof panel section and a second position wherein it extends generally laterally outwardly from said first roof panel section.

3. A roof structure as set forth in claim 2 wherein said second roof panel section in its second position extends generally laterally outwardly and downwardly from said first roof panel section.

4. A roof structure as set forth in claim 2 including an end panel section supported on said structure to pivot between one position wherein said end panel section is disposed in generally parallel relation to said truss beams and another position wherein said end panel section cooperates with said second roof panel section in its second position to form a partial closure for an associated end portion of said roof structure.

5. A roof structure as set forth in claim 4 wherein said end panel section is supported to pivot about a vertical axis.

6. A roof structure as set forth in claim 2 including sealing means for forming a substantially watertight seal between associated portions of said first and second roof panel sections when said second roof panel section is in its second position.

7. A roof structure as set forth in claim 2 wherein said first roof panel section has a lip at its upper end extending in a horizontal direction and overlying an associated marginal portion of said second roof panel section when said second roof panel section is in its second position.

8. A roof structure as set forth in claim 7 including a sealing member carried by one of said roof panel sections comprising said first and second panel sections and disposed between said lip and said associated marginal portion when said roof panel section is in its second position.

9. A roof structure as set forth in claim 2 wherein a horizontally extending upper marginal edge portion of one of said side walls is connected to and supports the lower marginal edge portion of said first roof panel section.

10. A roof structure as set forth in claim 2 wherein one of said side walls is connected to said first roof panel section and said structure includes a third roof panel section connected along one edge to a horizontally extending upper marginal edge portion of the other of said side walls and extending upwardly and laterally outwardly therefrom.

11. A roof structure as set forth in claim 10 wherein a horizontally extending upper marginal edge portion of said third roof panel section is connected to a horizontally extending upper edge portion of one of said truss beams.

12. A roof structure as set forth in claim 10 wherein said second roof panel section in its second position is disposed in generally parallel relation to the plane of said third roof panel section.

13. A roof structure as set forth in claim 2 wherein said first roof panel section comprises a frame supporting at least one translucent panel and said structure includes at least one solar energy panel and means supporting said one solar energy panel inwardly of and in general registry with said one translucent panel.

14. A roof structure as set forth in claim 12 wherein said first roof panel section is upwardly inclined at an angle of approximately 60 degrees to the horizontal.

15. A roof structure as set forth in claim 1 wherein said lifting means comprises lifting rings secured to said one roof panel section and said other roof panel section.

16. A sawtooth roof module comprising a truss assembly including a pair of horizontally extending truss beams and a plurality of cross braces extending between the connecting said truss beams in laterally spaced parallel relation, and a horizontally elongated roof panel assembly supported on said truss assembly and including a first roof panel section supported in an upwardly inclined position and having its upper end disposed generally above one of said truss beams, a second roof panel section connected to the upper end of said first roof panel section to pivot relative thereto about a horizontal axis between a first position wherein it depends in a generally vertically disposed position from said first roof panel section and a second position wherein it extends generally laterally outwardly and downwardly from said first roof panel section, a generally horizontally disposed rain trough-walkway supported on said truss assembly and having a generally U-shaped cross section, said rain trough-walkway having a generally horizontally disposed bottom wall pitched downwardly in at least one direction and a pair of opposing laterally spaced apart side walls, one of said side walls being connected at its upper edge to the lower edge of said first roof panel section, and a third roof panel section connected to the upper edge of the other of said side walls and upwardly and laterally outwardly inclined therefrom, said third panel section being connected at its upper end portion to a upper horizontally extending portion of the other of said truss beams.

17. A sawtooth roof module as set forth in claim 16 wherein said first roof panel section includes a frame and at least one translucent panel supported in said frame and said module includes at least one solar energy collector panel supported on said first roof panel section inwardly of said one translucent panel in parallel relation thereto and in general registry therewith.

18. A sawtooth roof structure as set forth in claim 17 wherein said panel assembly includes at least one gasket, said one gasket supporting said one translucent panel in said frame, said one solar energy collector panel being disposed in generally sealing engagement with said gasket, said gasket maintaining said one solar energy collector panel in parallel spaced relation to said one translucent panel.

19. A sawtooth roof module as set forth in claim 16 including an end panel section supported to pivot between one position wherein said end panel section is disposed in generally parallel relation to said truss beams and another position wherein said end panel section is disposed in a transverse plane relative to said truss beams and cooperates with said second roof panel section in its second position to form a partial closure for an associated end portion of said roof module.

20. A sawtooth roof module as set forth in claim 19 wherein said end section is supported to pivot about a vertical axis.

21. A method for making a roof structure for a building comprising the steps of fabricating a roof module having a roof panel assembly including an upwardly inclined first roof panel section and a second roof panel section having one end portion pivotally connected to the upper end portion of said first roof panel section, pivoting said second roof panel section to a generally vertically depending position relative to said first roof panel section, transporting said roof module to a building site with said second roof panel in its depending position, pivoting said second roof panel section from its depending position to a laterally outwardly extending position relative to said first roof panel section, lifting said roof module into position on a partially erected building, and fastening the end portion of said second panel assembly opposite said one end in its laterally outwardly extending position to a roof panel section comprising a part of another roof module of like kind.

22. A method for making a roof structure as set forth in claim 21 wherein the step of fabricating comprises fabricating a roof structure having an end panel section pivotally movable between an end closure position, wherein said end panel section cooperates with said second roof panel section in its laterally outwardly extending position to form a partial end closure for said roof module and a transporting position, wherein said end panel section is generally parallel to said second roof panel section in its depending position, and including the additional steps of pivoting said end panel section to its transporting position before the step of transporting said roof section and pivoting said end panel section to its end closure position after said second panel section is pivoted to its laterally outwardly and downwardly inclined position, and fastening said end panel in its end closure position.

23. A method for making a roof structure for a building comprising the steps of fabricating a roof module having a roof panel assembly including a plurality of roof panel sections, pivotally connecting one end portion of one of said panel sections to the upper edge of another of said panel sections to pivot about a generally horizontal axis, pivoting said one panel section laterally inwardly relative to said other panel section and to a traveling position to reduce the lateral width of said roof module, transporting said roof module to a building site with said one panel section in its traveling position, pivoting said one panel section from its traveling position to a laterally outwardly extending position relative to said other panel section while simultaneously lifting said roof module into position on a partially erected building, and fastening said one panel section in its laterally outwardly extending position after said roof module has been lifted in position.

24. A method for making a roof structure as set forth in claim 23 wherein the step of fastening is further characterized as fastening the end portion of said second roof panel section opposite said one end to a roof panel section comprising a part of another roof module of like kind.

25. A method for making a roof structure for a building comprising the steps of fabricating a roof module having a roof panel assembly including an upwardly inclined first roof panel section and a second roof panel section having one end portion pivotally connected to the upper end portion of said first roof panel section, pivoting said second roof panel section to a generally vertically depending position relative to said first roof panel section, transporting said roof module to a building site with said second roof panel in its depending position, pivoting said second roof panel section from its depending position to a laterally outwardly extending position relative to said first roof panel section, lifting said roof module into position on a partially erected building, said steps of pivoting said second roof panel section to a laterally outwardly extending position and lifting said roof module being performed simultaneously, and fastening said second panel assembly in its laterally outwardly extending position.

26. A method for making a roof structure for a building comprising the steps of fabricating a roof module having a roof panel assembly including an upwardly inclined first roof panel section and a second roof panel section having one end portion pivotally connected to the upper end portion of said first roof panel section, pivoting said second roof panel section to a generally vertically depending position relative to said first roof panel section, transporting said roof module to a building site with said second roof panel in its depending position, attaching a sling to said second roof panel section in its depending position and to another part of said roof module and lifting said roof module with said sling to substantially simultaneously pivot said second roof panel section to its laterally outwardly extending position relative to said first roof panel section and to lift said roof module into position on a partially erected building, and fastening said second panel assembly in its laterally outwardly extending position.

27. A roof structure comprising a truss assembly including a plurality of horizontally extending truss beams and a plurality of braces extending between and connecting said truss beams in laterally spaced parallel relation, and a horizontally elongated roof panel assembly supported on said truss assembly and having a plurality of roof panel sections including an inclined first roof panel section supported in fixed position on said truss assembly said first roof panel section extending upwardly and laterally outwardly relative to said truss assembly and terminating at a horizontally extending upper end portion disposed generally above and immediately laterally outwardly beyond one of said truss beams which defines one side of said truss assembly, said roof panel assembly including a second roof panel section hingedly connected to said upper end portion to pivot about a horizontal axis relative to said first roof panel section between a first position wherein said second panel section depends in a vertically disposed position from said upper end portion and is disposed generally adjacent said one truss beam and a second position wherein said second panel is inclined downwardly from said upper end portion and laterally outwardly in a direction away from said truss assembly.

28. A roof structure as set forth in claim 27 including lifting means attached at critical balance points to said first roof panel section and to at least another of said roof panel sections for raising said second roof panel section from its first position to its second position and for hoisting said roof assembly and said truss assembly with said second panel in its second position.

29. A roof structure as set forth in claim 27 further characterized by said roof panel assembly including a rain troughwalkway having a generally U-shaped cross section and including a generally horizontally disposed bottom wall and a pair of opposing laterally spaced apart side walls and a third roof panel section, said first panel section having its lower end portion connected to a horizontally extending upper end portion of one of said side walls and supported thereby, said third roof panel section having its lower end portion connected to a horizontally extending upper end portion of the other of said side walls and being inclined upwardly and laterally outwardly therefrom, said third roof panel section having its upper end portion connected to and supported by a horizontally extending upper portion of another of said truss beams which defines the side of said truss assembly opposite said one side.

30. A roof structure comprising an open truss assembly including a plurality of horizontally extending truss beams and a plurality of braces extending between and connecting said truss beams in laterally spaced parallel relation, and a horizontally elongated roof panel assembly supported on said open truss assembly and including a first roof panel section supported in a fixed upwardly inclined position and having a frame including an opening therethrough a translucent panel supported on said frame in registry with said opening and a gasket forming a seal between said translucent panel and said frame, a second roof panel section hingedly connected to the upper end of said first roof panel section to pivot about a horizontal axis relative to said first roof panel section between a first position wherein said second roof panel section depends in vertically disposed position from said first roof panel section and a second position wherein said second panel section is inclined downwardly and laterally outwardly away from said first roof panel section, a solar energy panel, and means supporting said solar energy panel on said first roof panel section inwardly of and in generally parallel spaced relation to said translucent panel and in sealing engagement with said gasket, said translucent panel, said gasket, and said solar energy panel defining an enclosed space.

* * * * *